United States Patent [19]

Egraz et al.

[11] Patent Number: 6,093,764
[45] Date of Patent: Jul. 25, 2000

[54] USE OF A COPOLYMER WITH A SURFACE-ACTIVE STRUCTURE AS A DISPERSING AND/OR CRUSHING AID

[75] Inventors: Jean-Bernard Egraz, Ecully; Christian Jacquemet, Lyons; Jacques Mongoin, Quincieux; Jean-Marc Suau, Lucenay, all of France

[73] Assignee: Coatex S.A., Genay, France

[21] Appl. No.: 09/119,015

[22] Filed: Jul. 20, 1998

[30] Foreign Application Priority Data

Jul. 18, 1997 [FR] France .................................. 97 09387

[51] Int. Cl.⁷ .............................. C08K 3/10; C08K 3/26; C08K 3/20; C08K 3/34; C08L 33/02
[52] U.S. Cl. ..................... 524/413; 524/425; 524/430; 524/437; 524/445; 524/446; 524/447; 524/449; 524/558
[58] Field of Search ..................... 524/413, 425, 524/430, 437, 445, 446, 447, 449, 451, 558

[56] References Cited

U.S. PATENT DOCUMENTS

| | | | |
|---|---|---|---|
| 4,384,096 | 5/1983 | Sonnabend | 524/588 |
| 5,294,693 | 3/1994 | Egraz et al. | 526/318.4 |
| 5,412,139 | 5/1995 | Blanchard et al. | 524/40 |
| 5,423,999 | 6/1995 | Egraz et al. | 524/558 |
| 5,432,238 | 7/1995 | Egraz et al. | 526/240 |
| 5,432,239 | 7/1995 | Egraz et al. | 526/240 |
| 5,464,895 | 11/1995 | Blanchard et al. | 524/425 |

*Primary Examiner*—Peter A. Szekely
*Attorney, Agent, or Firm*—Oblon, Spivak, McClelland, Maier & Neustadt, P.C.

[57] ABSTRACT

A method of dispersing mineral substances in aqueous media, comprising combining:

water, at least one mineral substance, and a copolymer which comprises the following monomers in polymerized form:

(a) at least one ethylenically unsaturated monomer having at least one carboxyl function, (b) optionally, at least one ethylenically unsaturated monomer having at least one sulphonyl function and/or phosphoryl function, (c) optionally, at least one ethylenically unsaturated monomer having no carboxyl function, and (d) at least one ethylenically unsaturated oxyalkylated monomer terminating with a hydrophobic chain represented by a specified formula, where the sum of the weight percent of (a), (b), (c) and (d) in the copolymer is 100%, and the copolymer has a specific viscosity of at most 50. Mineral substances may be effectively dispersed according to the invention, regardless of the surface properties thereof.

24 Claims, No Drawings

USE OF A COPOLYMER WITH A SURFACE-ACTIVE STRUCTURE AS A DISPERSING AND/OR CRUSHING AID

BACKGROUND OF THE INVENTION

1. Field of the Invention

The present invention relates to the use of a copolymer, in which at least one of the monomers has a surface-active structure, as a dispersing agent or aid for crushing mineral substances in aqueous suspension, regardless of the nature of the mineral substance.

2. Discussion of the Background

It has long been common practice as a means of preparing industrial products for use in the paper industry, particularly as a filler or for coating the paper, to make up aqueous suspensions of different mineral substances or mineral pigment fillers, whose particles have surfaces with different affinities to water.

The first category of mineral substances includes mineral substances with a charged hydrophilic surface such as the natural or synthetic calcium carbonates, for example, particularly chalks, calcites or marbles, the dolomites or kaolins as well as calcium sulphate or titanium oxides, satin white, aluminium hydroxides and others. The second category includes mineral fillers with a hydrophobic surface such as talc, mica and others, for example.

These two types of mineral substances do not exhibit the same theological behavior when placed in suspension in water, particularly when prepared in high concentrations for supply to paper factories. However, they must exhibit the same quality criteria for the user, i.e. the Brookfield viscosity thereof must be such that there will be no risk of sedimentation or hardening of the settled mineral substance particles in order to ensure that they will be easy for the user to handle even after storage in tanks for several days without agitation. Furthermore, these suspensions must have as high a content of mineral substance as possible in order to reduce all the costs inherent in transportation due to the quantity of water present.

Prior to the present invention, the dispersing agents or crushing aids conventionally used for mineral fillers with a hydrophilic surface are polyacrylates with a low molecular weight or with a specific viscosity of less than or equal to 25 (EP 100 947, EP 542 643, EP 542 644). However, these agents have a disadvantage in that they are not very efficient when placing in suspension and/or crushing hydrophobic substances, such as talc or mica, which are commonly used alone or in mixtures.

The person skilled in the art is familiar with other agents which can be used for this purpose, these being copolymers in which one of the monomers has a surface-active structure (EP 0 003 235, EP 0 215 565). These copolymers, however, have a disadvantage in that they are not efficient when it comes to placing in suspension and/or crushing mineral substances with a hydrophilic surface such as the calcium carbonates or kaolins, calcium sulphate or titanium oxides.

Consequently, until now, in order to disperse and/or crush a mineral substance with a hydrophobic surface, it has been extremely difficult for the skilled person to use a dispersing and/or crushing agent known for its efficiency in dispersing and/or as an aid for crushing mineral substances with a hydrophilic surface and vice-versa.

Faced with this problem of using dispersing agents and/or a crushing aid specific to a type of mineral substance and after a good deal of research, the applicant has found that selecting the radical of the hydrophobic chain of the surface-active monomer allows the copolymer to be used as a dispersing agent and/or crushing aid irrespective of the nature of the surfaces of the mineral substances to be dispersed and/or crushed.

SUMMARY OF THE INVENTION

One object of the present invention, therefore, is to provide a method of suspending mineral substances in aqueous suspensions, regardless of the nature of the surfaces of the mineral substances.

The object of the present invention, and others, may be accomplished with a method of suspending mineral substances in aqueous media comprising combining water, at least one mineral substance and, as a dispersing agent and/or crushing aid, a copolymer which contains the following monomers in polymerized form:

(a) at least one monomer which is ethylenically unsaturated and has a carboxylic function, (b) optionally, at least one monomer which is ethylenically unsaturated and has a sulphonic or phosphoric function or a mixture thereof (c) optionally, at least one monomer which is ethylenically unsaturated and has no carboxylic function (d) at least one surface-active oxyalkylated monomer which is ethylenically unsaturated and terminates with a hydrophobic chain.

Monomer (d) may be represented by the formula (I), below:

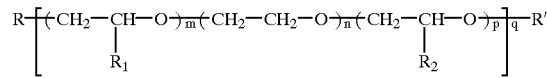

where m is at most 100, p is at most 100, n is at most 100, q is a number at least equal to 1 and such that $0 \leq q(n+m+p) \leq 100$, $R_1$ is hydrogen or a methyl or ethyl radical, $R_2$ is hydrogen or a methyl or ethyl radical.

R is a polymerizable unsaturated radical derived from an acrylic, methacrylic, maleic, itaconic, crotonic, or vinylphthalic ester or an unsaturated urethane, R' is a hydrophobic radical.

In the copolymer, the sum of the weight percent of (a), (b), (c) and (d) is 100%, and the copolymer has a specific viscosity of at most 50.

A more complete appreciation of the invention and many of the attendant advantages thereof will be readily obtained as the same becomes better understood by reference to the following detailed description.

DETAILED DESCRIPTION OF THE INVENTION

Monomer (d) in the copolymer is important for imparting to the polymer the ability to effectively disperse the mineral substances in the water medium, thereby producing the aqueous dispersion.

In one embodiment of the present invention, the copolymer contains:

(a) at least one ethylenically unsaturated monomer having a carboxylic function, which is selected from among the mono-acids such as acrylic, methacrylic, crotonic, isocrotonic or cinnamic acid, to which can be added, optionally, the diacids such as itaconic, fumaric, maleic or citraconic acid or alternatively the anhydrides of carboxylic acids such as maleic anhydride and the hemi-esters of diacids such as the monoesters at $C_1$ to $C_4$ of maleic or itaconic acids or mixtures thereof, (b) optionally, at least one ethylenically unsaturated monomer having a sulphonic function, selected from among acrylamide-methyl-propane-sulphonic acid, sodium methallylsulphonate, vinyl sulphonic acid and styrene sulphonic acid, or having a phosphoric function selected from among ethylene glycol methacrylate phosphate, propylene glycol methacrylate phosphate, ethylene glycol acrylate phosphate, propylene glycol acrylate phosphate and their ethoxylates or mixtures thereof, (c) optionally, at least one ethylenically unsaturated monomer having no carboxylic function, selected from the group comprising the esters of acrylic or methacrylic acids such as the methyl, ethyl, butyl, 2-ethyl-hexyl acrylates or methacrylates or acrylonitrile, methacrylonitrile, vinyl acetate, styrene, methylstyrene, diisobutylene, vinylpyrrolidone, vinylcaprolactam, or alternatively the unsaturated amides such as acrylamide, methacrylamide or their substituted derivatives such as, for example, dimethylaminopropyl acrylamide or methacrylamide, the acrylic or methacrylic esters of glycol, methacrylamido-propyl-trimethyl-ammonium chloride or sulphate, methacrylate of trimethylamrnonium-ethyl chloride or sulphate as well as their acrylate and quaternised acrylamnide counterparts and/or dimethyl-diallylammonium chloride, (d) at least one ethylenically unsaturated oxyalkylated monomer terminating with a hydrophobic chain having the general formula (I):

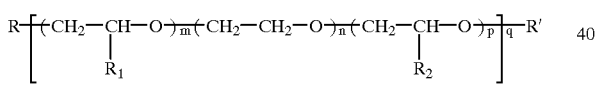

in which m and p each represent the number of alkylene oxide units and are, independently, less than or equal to 100, n represents the number of ethylene oxide units and is less than or equal to 100, q is a number at least equal to 1 and such that:
$0 \leq q(n+m+p) \leq 100$ $R_1$ is hydrogen or the methyl or ethyl radical, $R_2$ is hydrogen or the methyl or ethyl radical.

R represents the polymerizable unsaturated radical belonging to the group of acrylic, methacrylic, maleic, itaconic, crotonic, vinylphthalic esters as well as the unsaturated urethanes such as, for example, acrylurethane, methacrylurethane, α,α' dimethyl-m-isopropenyl-benzylurethane, or allylurethane.

R' represents the hydrophobic radical such as the tristyrylphenyl as well as the linear or branched alkyl, alkylaryl, arylalkyl, aryl groups having at least 8-carbon atoms or the dialkylamines having at least 8 carbon atoms when R represents radical belonging to the group of unsaturated urethanes, and R' represents the hydrophobic radical such as the tristyrylphenyl as well as the linear or branched alkyl, alkylaryl, arylalkyl, aryl groups having more than 30 carbon atoms or the dialkylamines having at least 22 carbon atoms when R represents the polymerizable unsaturated radical belonging to the group of acrylic, methacrylic, maleic, itaconic, crotonic or vinylphthalic esters, where the sum of the weight percents of monomers (a), (b), (c) and (d) in the copolymer is equal to 100%, and the copolymer has a specific viscosity at most equal to 50, and preferably at most equal to 25.

More specifically, the use of the above-mentioned copolymer is characterized in that said copolymer contains, expressed by weight:

(a) from 99 to 10%, and even more particularly for reasons inherent in the copolymerization process, from 97% to 50% of at least one ethylenically unsaturated monomer having a carboxylic function, which is be selected from among the mono-acids such as acrylic, methacrylic, crotonic, isocrotonic, cinnamic acid, to which the diacids may optionally be added such as itaconic, fumaric, maleic, citraconic acid, or the carboxylic acid anhydrides such as maleic anhydride and the hemi-esters of diacids such as the monoesters at $C_1$ to $C_4$ of maleic or itaconic acids or mixtures thereof, (b) from 0 to 50% of at least one ethylenically unsaturated monomer having a sulphonic function selected from among acrylamide-methyl-propane-sulphonic acid, sodium methallylsulphonate, vinyl sulphonic acid and styrene sulphonic acid, or having a phosphoric function selected from among ethylene glycol methacrylate phosphate, propylene glycol methacrylate phosphate, ethylene glycol acrylate phosphate, propylene glycol acrylate phosphate and their ethoxylates or mixtures thereof, (c) from 0% to 50% of at least one ethylenically unsaturated monomer having no carboxylic function, selected from the group comprising the acrylic or methacrylic acid esters such as the methyl, ethyl, butyl, 2-ethyl-hexyl acrylates or methacrylates or acrylonitrile, methacrylonitrile, vinyl acetate, styrene, methylstyrene, diisobutylene, vinylpyrrolidone, vinylcaprolactam, or the unsaturated amides such as acrylamide, methacrylamide or their substituted derivatives such as dimethylaminopropyl acrylamide or methacrylamide, the acrylic or methacrylic esters of glycol, methacrylamido-propyltrimethyl-amrnmonium chloride or sulphate, the methacrylate of trimethyl-ammonium-ethyl chloride or sulphate as well as their acrylate and quaternised acrylamide counterparts and/or dimethyldiallylammonium chloride, (d) from 1% to 90%, and even more particularly for reasons relating to the copolymerization process from 3% to 50%, of at least one ethylenically unsaturated oxyalkylated monomer terminating with a hydrophobic chain, of the general formula (I):

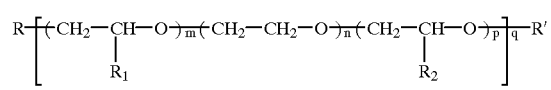

in which:

m and p each represent a number of alkylene oxide units and are, independently, less than or equal to 100, n represents a number of ethylene oxide units and is less than or equal to 100, q is a number at least equal to 1 and such that:

0≦q(n+m+p)≦100

$R_1$ is hydrogen or the methyl or ethyl radical, $R_2$ is hydrogen or the methyl or ethyl radical, R represents the polymerizable unsaturated radical belonging to the group of acrylic, methacrylic, maleic, itaconic, crotonic, vinylphthalic esters as well as the unsaturated urethanes such as, for example, acrylurethane, methacrylurethane, α,α' dimethyl-m-isopropenyl-benzylurethane, allylurethane.

R' represents the hydrophobic radical such as the tristyrylphenyl as well as the linear or branched alkyl, alkylaryl, arylalkyl, aryl groups having at least 8-carbon atoms or the dialkylamines having at least 8 carbon atoms when R represents radical belonging to the group of unsaturated urethanes, and R' represents the hydrophobic radical such as the tristyrylphenyl as well as the linear or branched alkyl, alkylaryl, arylalkyl, aryl groups having more than 30 carbon atoms or the dialkylamines having at least 22 carbon atoms when R represents the polymerizable unsaturated radical belonging to the group of acrylic, methacrylic, maleic, itaconic, crotonic or vinylphthalic esters, where the sum of the weight percents of monomers (a), (b), (c) and (d) in the copolymer is equal to 100%, and the copolymer has a specific viscosity at most equal to 50, and preferably at most equal to 25.

In monomer (d), the variables m and p represent the number of alkylene oxide units. These variables are each, independently, less than or equal to 100 (at most 100). The variables m and p may, independently, be 0, 1, 2, 5, 10, 15, 20, 25, 30, 35, 40, 45, 50, 55, 60, 65, 75, 85, 90, 95, 97 and 99, inclusive of all specific values and subranges therebetween.

The variable n represents the number of ethylene oxide units and is less than or equal to 100 (i.e., at most 100). The variable n may be 0, 1, 2, 5, 10, 15, 20, 25, 30, 35, 40, 45, 50, 55, 60, 65, 75, 85, 90, 95, 97 and 99, inclusive of all specific values and subranges therebetween.

In the copolymer the amount of monomer (a) may be 10 to 99% by weight. This range includes all specific values and subranges therebetween, including 15, 20, 25, 30, 35, 40, 45, 50, 60, 65, 70, 75, 80, 85, 90, 95, 97 and 98% by weight.

The amount of monomer (b) in the copolymer may be 0 to 50% by weight. This range includes all specific values and subranges therebetween, including 0.1, 0.2, 0.5, 1, 2, 5, 10, 15, 20, 25, 30, 35, 40 and 45% by weight.

The amount of monomer (c) in the copolymer may be 0 to 50% by weight. This range includes all specific values and subranges therebetween, including 0.1, 0.2, 0.5, 1, 2, 5, 10, 15, 20, 25, 30, 35, 40 and 45% by weight.

The amount of monomer (c) in the copolymer may be 1 to 90% by weight. This range includes all specific values and subranges therebetween, including 2, 3, 5, 10, 15, 20, 25, 30, 35, 40, 45, 50, 60, 65, 70, 75, 80 and 85% by weight.

The copolymer used for the purposes of the invention may be obtained by well-known methods of radical copolymerization in solution, in direct or inverse emulsion, in suspension or precipitation in appropriate solvents in the presence of known catalytic systems and transfer agents.

The copolymer may be obtained in acid form and possibly distilled may be partially or totally neutralized by one or more neutralizing agents having a monovalent function or a polyvalent function such as, for example, those selected from the group comprising the alkaline cations, in particular sodium, potassium, ammonium or the primary, secondary or tertiary aliphatic and/or cyclic amines such as, for example, stearylamine, the ethanolamines (mono-, di-triethanolamine), mono- and diethyl amine, cyclohexylamine, methylcyclohexylamine or those selected from the group comprising the divalent alkaline earth cations, in particular magnesium and calcium or alternatively zinc, as well as the trivalent cations, including in particular aluminum, or alternatively certain cations with a higher valency.

Each neutralizing agent is used in a quantity suited to the neutralization rates appropriate to each valency function.

In another variant, the copolymer produced by the copolymerization reaction may be treated and separated into several phases, either before or after the total or partial neutralization reaction, using the static or dynamic processes familiar to the person skilled in the art, by one or more polar solvents belonging in particular to the group comprising water, methanol, ethanol, propanol, isopropanol, the butanols, acetone, tetrahydrofuran or mixtures thereof.

One of the phases then corresponds to the copolymer used for the purposes of the invention as a dispersing agent and/or crushing agent for mineral substances in aqueous suspension.

The specific viscosity of the copolymer is symbolized by the letter "η" and is determined in the following way:

A polymer solution is made up to obtain a solution corresponding to 2.5 g of dry polymer neutralized with soda and 50 ml of a bipermutated water solution. Using a capillary viscometer with a Baume constant equal to 0.000105 placed in a bath thermostatically controlled to 25° C., a measurement is taken of the flow time of a given volume of the above-mentioned solution containing the polymer as well as the flow time of the same solution of bipermutated water without the said copolymer. It will then be possible to define the specific viscosity "η", by means of the following equation:

$$"\eta" = \frac{\text{(flow time of the polymer solution)} - \text{(flow time of the permutated water solution)}}{\text{flow time of the permutated water solution}}$$

The capillary tube is generally selected so that the flow time of the permutated water solution without the copolymer is approximately 90 to 100 seconds, thus giving highly accurate specific viscosity readings.

One practical one way of dispersing or placing the mineral substances to be dispersed in suspension is to prepare an aqueous suspension of the dispersing agent under agitation, to which is added the mineral substance or substances to be dispersed, which may be of very diverse origins falling into two categories.

The first category is made up of mineral substances with a charged hydrophilic surface such as the natural or synthetic calcium carbonates, for example, particularly chalks, calcites, marbles or dolomites or the kaolins, calcium sulphate, titanium oxides or satin white or aluminum hydroxides or any other mineral with a hydrophilic surface.

The second includes mineral fillers with a hydrophobic surface such as talc, mica and any other mineral with a hydrophobic surface.

The particle size of the mineral substance in the suspension is such that 90% of the particles have a diameter of less than 2 micrometers.

The suspension preferably contains at least 5% by weight of the mineral substance(s). The suspension may contain, for example, at least 10, 15, 20, 25, 30, 35, 40, 45, 50, 55, 60, 70, 80 and 85% by weight, inclusive of all specific values and subranges therebetween.

Similarly, in practice, the operation of crushing the mineral substance or substances to be refined consists in crushing the mineral substance or substances with a crushing medium in very fine particles in an aqueous medium containing the crushing agent.

The crushing medium added to the suspension of the mineral substance or substances to be crushed advantageously has a grain size of between 0.20 and 4 millimeters. The crushing medium is generally present in the form of particles of substances as diverse as silicon oxide, aluminum oxide, zirconium oxide or mixtures thereof as well as the very hard synthetic resins, steels or others. An example of a composition for such crushing media is given in patent FR 2 303 681, incorporated herein by reference, which describes crushing media made up of 30 to 70% by weight of zirconium oxide, 0.1 to 5% of aluminum oxide and from 5 to 20% of silicon oxide.

By preference, the crushing medium is added to the suspension in a quantity such that the ratio by weight of this crushing medium to the mineral substance to be crushed is at least 2/1, this ratio preferably being within the ranges of 3/1 and 5/1.

The mixture of the suspension and the crushing medium is then subjected to mechanical agitation, such as that produced in a conventional crusher with micro-elements.

In accordance with the invention, the dispersing agent and/or crushing aid is also introduced to the mixture comprising the aqueous suspension of mineral substances and the crushing medium in a quantity of 0.05% to 5% by weight of the dried fraction of said polymers relative to the dry weight of the mineral substance or substances to be refined.

The time needed to produce an excellent fineness of the mineral substances after crushing will depend on the nature and quantity of the mineral substances to be crushed as well as on the agitation method used and the ambient temperature during the crushing operation.

The scale of importance of the invention will be more readily appreciated from the following examples, which are given by way of illustration only:

EXAMPLE 1

This example relates to the use of a copolymer, in which at least one of the monomers has a surface-active structure, for the preparation of aqueous suspensions of calcium carbonate.

To this end, for each of the following tests, performed on a marble from the Gummern deposit (Austria) in which the grain size is such that 90% of the particles are of a diameter of less than 2 micrometers, a quantity of said marble necessary to obtain a suspension with a 65% concentration of dry substance is added, by pouring and under agitation, to a two-liter beaker containing water. This beaker also contains a quantity of copolymer to be tested corresponding to 0.5% by weight of dry copolymer relative to the total weight of dry substance present in the suspension.

After 20 minutes of agitation, the Brookfield viscosities are measured, at ambient temperature, using a Brookfield viscometer of the RVT type at 10 revolutions per minute (r/min) and 100 r/min using the appropriate spindle.

Test N° 1:
This test, illustrating the prior art, uses a sodium polyacrylate with a specific viscosity of 0.45.

Test N° 2:
This test, illustrating the prior art, uses a mixture consisting of 25 parts by weight of a sodium polyacrylate with a specific viscosity of 0.45 and 75 parts by weight of an alkylene polyoxide marketed under the name of Pluronic PE 4300 by BASF.

Test N° 3:
This test, illustrating the invention, uses a polymer 100% neutralised by soda having a specific viscosity of 4.35 and made up, by percentage weight, of:
90% of acrylic acid
10% of tristyryl phenol methacrylate ethoxylated with 25 moles of ethylene oxide.

Test N° 4:
This test, illustrating the invention, uses a polymer 100% neutralised by soda having a specific viscosity of 4.38 and made up, by percentage weight, of:
90% of acrylic acid
10% of tristyryl phenol methacrylate ethoxylated with 40 moles of ethylene oxide.

Test N° 5:
This test, illustrating the invention, uses a polymer 100% neutralised by soda having a specific viscosity of 4.43 and made up, by percentage weight, of:
90% of acrylic acid
10% of tristyryl phenol methacrylate ethoxylated with 60 moles of ethylene oxide.

Test N° 6:
This test, illustrating the invention, uses a polymer 100% neutralised by soda having a specific viscosity of 2.54 and made up, by percentage weight, of:
95% of acrylic acid
5% of Methacrylurethane of the general formula (I) in which the hydrophobic radical R' is a linear alkyl group with 22 carbon atoms, m and p are equal to 0, q=1 and n equals 25.

Test N° 7:
This test, illustrating the invention, uses a polymer 100% neutralised by soda having a specific viscosity of 1.52 and made up, by percentage weight, of:
95% of acrylic acid
5% of methacrylate of the general formula (I) in which the hydrophobic radical R' is a —N—(R"R''') group where R" and R''' are linear alkyl chains with 12 carbon atoms, m and p are equal to 0, q=1 and n equals 50.

Test N° 8:
This test, illustrating the invention, uses a polymer 100% neutralised by soda having a specific viscosity of 2.47 and made up, by percentage weight, of:
95% of acrylic acid
5% of methacryluerethane of the general formula (I) in which the hydrophobic radical R' is a branched alkyl group with 28 carbon atoms, m and p are equal to 0, q=1 and n equals 25.

Test N° 9:
This test, illustrating the invention, uses a polymer 100% neutralised by soda having a specific viscosity of 1.79 and made up, by percentage weight, of:
95% of acrylic acid
5% of methacrylurethane of the general formula (I) in which the hydrophobic radical R' is a branched alkyl group with 30 carbon atoms, m and p are equal to 0, q=1 and n equals 25.

Test N° 10:
This test, illustrating the invention, uses a polymer 100% neutralised by soda having a specific viscosity of 2.59 and made up, by percentage weight, of:
90% of acrylic acid
10% of methacrylate of the general formula (I) in which the hydrophobic radical R' is a branched alkyl group with 32 carbon atoms, m and p are equal to 0, q=1 and n equals 25.

Test N° 11:

This test, illustrating the invention, uses a polymer 100% neutralised by soda having a specific viscosity of 5.49 and made up, by percentage weight, of:

80% of acrylic acid
2% of ethyl acrylate
8% of methacrylic acid
10% of methacrylurethane of the general formula (I) in which the hydrophobic radical RI is a tristyrylphenyl radical, m and p are equal to 0, q=1 and n equals 25.

Test N° 12:

This test, illustrating the invention, uses a polymer 100% neutralised by soda having a specific viscosity of 3.02 and made up, by percentage weight, of:

97% of acrylic acid
3% of tristyryl phenol methacrylate ethoxylated with 25 moles of ethylene oxide.

Test N° 13:

This test, illustrating the invention, uses a polymer 100% neutralised by soda having a specific viscosity of 3.94 and made up, by percentage weight, of:

93% of acrylic acid
7% of tristyryl phenol methacrylate ethoxylated with 25 moles of ethylene oxide.

Test N° 14:

This test, illustrating the invention, uses a polymer 100% neutralised by soda having a specific viscosity of 3.74 and made up, by percentage weight, of:

85% of acrylic acid
15% of tristyryl phenol methacrylate ethoxylated with 25 moles of ethylene oxide.

Test N° 15:

This test, illustrating the invention, uses a polymer 100% neutralised by soda having a specific viscosity of 7.53 and made up, by percentage weight, of:

85% of acrylic acid
5% of methacrylic acid
10% of tristyryl phenol methacrylate ethoxylated with 25 moles of ethylene oxide.

Test N° 16:

This test, illustrating the invention, uses a polymer 100% neutralised by soda having a specific viscosity of 5.58 and made up, by percentage weight, of:

85% of acrylic acid
5% of itaconic acid
10% of tristyryl phenol methacrylate ethoxylated with 25 moles of ethylene oxide.

Test N° 17:

This test, illustrating the invention, uses a polymer 100% neutralised by soda having a specific viscosity of 7.16 and made up, by percentage weight, of:

85% of acrylic acid
5% of maleic acid
10% of tristyryl phenol methacrylate ethoxylated with 25 moles of ethylene oxide.

Test N° 18:

This test, illustrating the invention, uses a polymer 100% neutralised by soda having a specific viscosity of 6.68 and made up, by percentage weight, of:

85% of acrylic acid
5% of acrylamido-methyl-propane-sulphonic acid
10% of tristyryl phenol methacrylate ethoxylated with 25 moles of ethylene oxide.

Test N° 19:

This test, illustrating the invention, uses a polymer 100% neutralised by soda having a specific viscosity of 4.38 and made up, by percentage weight, of:

85% of acrylic acid
5% of acrylamide
10% of tristyryl phenol methacrylate ethoxylated with 25 moles of ethylene oxide.

Test N° 20:

This test, illustrating the invention, uses a polymer 100% neutralised by soda having a specific viscosity of 5.71 and made up, by percentage weight, of:

85% of acrylic acid
5% of ethylene glycol methacrylate phosphate
10% of tristyryl phenol methacrylate ethoxylated with 25 moles of ethylene oxide.

Test N° 21:

This test, illustrating the invention, uses a polymer 100% neutralised by soda having a specific viscosity of 5.49 and made up, by percentage weight, of:

80% of acrylic acid
2% of ethyl acrylate
8% of methacrylic acid
10% of methacrylurethane of general formula (I) in which the hydrophobic radical R' is a tristyrylphenyl radical, m and p are equal to 0, q=1 and n equals 25.

Test N° 22:

This test, illustrating the invention, uses a polymer 100% neutralised by soda having a specific viscosity of 0.67 and made up, by percentage weight, of:

95% of acrylic acid
5% of tristyryl phenol methacrylate ethoxylated with 25 moles of ethylene oxide.

Test N° 23:

This test, illustrating the invention, uses a polymer 100% neutralised by soda having a specific viscosity of 1.94 and made up, by percentage weight, of:

90% of acrylic acid
10% of tristyryl phenol methacrylate ethoxylated with 25 moles of ethylene oxide.

Test N° 24:

This test, illustrating the invention, uses a polymer 100% neutralised by soda having a specific viscosity of 2.66 and made up, by percentage weight, of:

90% of acrylic acid
10% of tristyryl phenol methacrylate ethoxylated with 25 moles of ethylene oxide.

Test N° 25:

This test, illustrating the invention, uses a polymer 100% neutralised by soda having a specific viscosity of 12.04 and made up, by percentage weight, of:

90% of acrylic acid
10% of tristyryl phenol methacrylate ethoxylated with 25 moles of ethylene oxide.

Test N° 26:

This test, illustrating the invention, uses a polymer 70% neutralised by soda having a specific viscosity of 4.35 and made up, by percentage weight, of:

90% of acrylic acid
10% of tristyryl phenol methacrylate ethoxylated with 25 moles of ethylene oxide.

The results of all these experiments are set out in table 1 below.

TABLE 1

| Test | | Brookfield viscosity of the suspension in mPa · s | |
|---|---|---|---|
| | No | 10 r/min | 100 r/min |
| Prior art | 1 | 2000 | 350 |
| Prior art | 2 | 24000 | 6200 |
| Invention | 3 | 800 | 210 |
| Invention | 4 | 1000 | 225 |
| Invention | 5 | 1900 | 320 |
| Invention | 6 | 1280 | 270 |
| Invention | 7 | 1400 | 260 |
| Invention | 8 | 840 | 210 |
| Invention | 9 | 1040 | 230 |
| Invention | 10 | 1150 | 230 |
| Invention | 11 | 750 | 210 |
| Invention | 11 | 1250 | 270 |
| Invention | 13 | 1100 | 230 |
| Invention | 14 | 950 | 230 |
| Invention | 15 | 600 | 180 |
| Invention | 16 | 600 | 175 |
| Invention | 17 | 700 | 215 |
| Invention | 18 | 800 | 230 |
| Invention | 19 | 1100 | 290 |
| Invention | 20 | 600 | 185 |
| Invention | 21 | 750 | 210 |
| Invention | 22 | 1850 | 325 |
| Invention | 23 | 1000 | 215 |
| Invention | 24 | 1100 | 290 |
| Invention | 25 | 650 | 215 |
| Invention | 26 | 190 | 110 |

Table 1 highlights the fact that by applying the invention, aqueous suspensions of calcium carbonate with low Brookfield viscosities are obtained.

It is also obvious from reading the table that using a polyacrylate in conjunction with an aklylene polyoxide, a formula currently used to place mineral substances with a hydrophobic surface in suspension, does not produce calcium carbonate suspensions with a low Brookfield viscosity.

EXAMPLE 2

This example illustrates the invention and relates to the use of a copolymer, in which at least one of the monomers has a surface-active structure, for the preparation of an aqueous suspension of calcium carbonate with a calcium content of dry substance equal to 45%.

To this end, for the purposes of test N° 27 below, conducted using a marble from the Gummern deposit (Austria) in which the grain size is such that 90% of the particles are of a diameter of less than 2 micrometers, a quantity of said marble necessary to obtain a suspension with a 45% concentration of dry substance is added, by pouring and under agitation, to a two-liter beaker containing water. This beaker also contains a quantity of copolymer to be tested corresponding to 0.23% by weight of dry copolymer relative to the total weight of dry substance present in the suspension.

The copolymer used is a polymer neutralised 75% by soda and the product of a fractionation process, having a specific viscosity of 4.35 and made up, by percentage weight, of:
90% of acrylic acid
10% of tristyryl phenol methacrylate ethoxylated with 25 moles of ethylene oxide.

After 20 minutes of agitation, the Brookfield viscosities are measured, at ambient temperature, using a Brookfield viscometer of the RVT type at 10 revolutions per minute (r/min) and 100 r/min using the appropriate spindle.

These viscosities are respectively 790 mPa.s and 110 mPa.s.

EXAMPLE 3

This example also concerns the use of a polymer, in which at least one of the monomers has a surface-active structure, to prepare aqueous suspensions of calcium carbonate but with a coarser grain size.

To this end, for each of the following tests conducted on a marble from a Norwegian deposit in which the grain size is such that 60% of the particles are of a diameter of less than 2 micrometers, a quantity of said marble necessary to obtain a suspension with a 75% concentration of dry substance is added, by pouring and under agitation, to a two-liter beaker containing water. This beaker also contains a quantity of copolymer to be tested corresponding to 0.5% by weight of dry copolymer relative to the total weight of dry substance present in the suspension.

After 20 minutes of agitation, the Brookfield viscosities (T0) are measured, at ambient temperature, using a Brookfield viscometer of the DVII type at 100 r/min using the appropriate spindle.

The Brookfield viscosities are also determined after 24 hours, 2 days, 3 days and one week of storage without agitation.

Once a reading had been taken of the Brookfield viscosity before agitation (viscosity AVAG) after 7 days of storage, the sample was agitated in order to ascertain the Brookfield viscosity after agitation (viscosity APAG).

Furthermore, these samples were diluted to 72% and stored for 7 days in order to see whether there was any sedimentation by inserting a spatula down to the base of the flask.

Test N° 28:
This test, illustrating the prior art, uses a sodium polyacrylate with a specific viscosity of 0.45.

Test N° 29:
This test, illustrating the invention, uses a polymer 100% neutralised by soda having a specific viscosity of 1.94 and made up, by percentage weight, of:
90% of acrylic acid
10% of tristyryl phenol methacrylate ethoxylated with 25 moles of ethylene oxide.

Test N° 30:
This test, illustrating the invention, uses a polymer 100% neutralised by soda having a specific viscosity of 3.02 and made up, by percentage weight, of:
97% of acrylic acid
3% of tristyryl phenol methacrylate ethoxylated with 25 moles of ethylene oxide.

Test N° 31:
This test, illustrating the invention, uses a polymer 100% neutralised by soda having a specific viscosity of 4.38 and made up, by percentage weight, of:
85% of acrylic acid
5% acrylamide
10% of tristyryl phenol methacrylate ethoxylated with 25 moles of ethylene oxide.

Test N° 32:
This test, illustrating the invention, uses a polymer 100% neutralised by soda having a specific viscosity of 5.49 and made up, by percentage weight, of:
80% of acrylic acid
2% of ethyl acrylate
8% methacrylic acid
10% of methacrylurethane, of the general formula (I), in which the hydrophobic radical R' is a tristyrylphenyl radical, m and p are equal to 0, q=1 and n equals 25.

The results of all these tests are set out in table 2 below.

TABLE 2

| | Test No. | T0 | Brookfield viscosity in mPa · s at 100 r/min | | | | | Sedimentation |
| | | | 24 hours AVAG | 2 days AVAG | 3 days AVAG | 7 days AVAG | 7 days APAG | |
| --- | --- | --- | --- | --- | --- | --- | --- | --- |
| Prior art | 28 | 1650 | 1070 | 1200 | 1375 | 1760 | 1790 | NO |
| Invention | 29 | 268 | 431 | 451 | 450 | 508 | 301 | NO |
| Invention | 30 | 309 | 594 | 622 | 616 | 641 | 309 | NO |
| Invention | 31 | 551 | 710 | 754 | 726 | 759 | 509 | NO |
| Invention | 32 | 526 | 769 | 809 | 818 | 849 | 512 | NO |

The table highlights the fact that aqueous suspensions of calcium carbonate can be obtained which have low Brookfield viscosities, are stable over time and do not exhibit any tendency towards sedimentation in spite of the fact that the grain size of the constituent particles is not as fine.

EXAMPLE 4

This example relates to the use of a copolymer, in which at least one of the monomers has a surface-active structure, to prepare aqueous suspensions of talc.

To this end and using the same operating method apart from the duration of agitation which is 45 minutes and using the same equipment as that used in example 1, talc, Finntalc C10 sold by Finnminerals, is mixed with a quantity of water necessary to produce a suspension with a 65% concentration of dry substance and a quantity of fully neutralised polymer to be tested corresponding to 2.0% by dry weight of dry acid copolymer relative to the total weight of dry substance present in the suspension.

Test N° 33:

This test, illustrating the prior art, uses a sodium polyacrylate with a specific viscosity of 0.45.

It can not be placed in suspension due to the fact that the agitator becomes blocked due to a too high viscosity.

Test N° 34:

This test, illustrating the prior art, uses a mixture consisting of 25 parts by weight of a sodium polyacrylate having a specific viscosity of 0.45 and 75 parts by weight of an alkylene polyoxide marketed under the name of Pluronic PE 4300 by BASF.

Test N° 35:

This test, illustrating the invention, uses a polymer which, after 100% neutralisation by soda, is a polymer with a specific viscosity of 7.5 and is made up, by percentage weight, of:

90% of acrylic acid

10% of tristyryl phenol methacrylate ethoxylated with 16 moles of ethylene oxide.

Test N° 36:

This test, illustrating the invention, uses a polymer which, after 100% neutralisation by soda, is a polymer with a specific viscosity of 4.0 and is made up, by percentage weight, of:

90% of acrylic acid

10% of tristyryl phenol methacrylate ethoxylated with 8 moles of ethylene oxide and oxypropylated with 13 moles of propylene oxide.

Test N° 37:

This test, illustrating the invention, uses a polymer which, after 100% neutralisation by soda, is a polymer which has a specific viscosity of 4.35 and is made up, by percentage weight, of:

90% of acrylic acid

10% of tristyryl phenol methacrylate ethoxylated with 25 moles of ethylene oxide.

Test N° 38:

This test, illustrating the invention, uses a polymer which, after 100% neutralisation by soda, is a polymer which has a specific viscosity of 4.38 and is made up, by percentage weight, of:

90% of acrylic acid

10% of tristyryl phenol methacrylate ethoxylated with 40 moles of ethylene oxide.

Test N° 39:

This test, illustrating the invention, uses a polymer which, after 100% neutralisation by soda, is a polymer which has a specific viscosity of 4.43 and is made up, by percentage weight, of:

90% of acrylic acid

10% of tristyryl phenol methacrylate ethoxylated with 60 moles of ethylene oxide.

Test N° 40:

This test, illustrating the invention, uses a polymer which, after 100% neutralisation by soda, is a polymer which has a specific viscosity of 2.59 and is made up, by percentage weight, of:

90% of acrylic acid

10% of methacrylate of general formula (I) in which the hydrophobic radical RI is a branched alkyl group with 32 carbon atoms, m and p are equal to 0, q=1 and n equals 25.

Test N° 41:

This test, illustrating the invention, uses a polymer which, after 100% neutralisation by soda, is a polymer which has a specific viscosity of 5.49 and is made up, by percentage weight, of:

80% of acrylic acid

2% of ethyl acrylate

8% of methacrylic acid

10% of methacrylurethane of general formula (I) in which the hydrophobic radical R' is a tristyrylphenyl radical, m and p are equal to 0, q=1 and n equals 25.

Test N° 42:

This test, illustrating the invention, uses a polymer which, after 100% neutralisation by soda, is a polymer which has a specific viscosity of 3.02 and is made up, by percentage weight, of:

97% of acrylic acid

3% of tristyryl phenol methacrylate ethoxylated with 25 moles of ethylene oxide.

Test N° 43:

This test, illustrating the invention, uses a polymer which, after 100% neutralisation by soda, is a polymer which has a specific viscosity of 3.31 and is made up, by percentage weight, of:

95% of acrylic acid
5% of tristyryl phenol methacrylate ethoxylated with 25 moles of ethylene oxide.

Test N° 44:

This test, illustrating the invention, uses a polymer which, after 100% neutralisation by soda, is a polymer which has a specific viscosity of 3.94 and is made up, by percentage weight, of:
93% of acrylic acid
7% of tristyryl phenol methacrylate ethoxylated with 25 moles of ethylene oxide.

Test N° 45:

This test, illustrating the invention, uses a polymer which, after 100% neutralisation by soda, is a polymer which has a specific viscosity of 3.74 and is made up, by percentage weight, of:
85% of acrylic acid
15% of tristyryl phenol methacrylate ethoxylated with 25 moles of ethylene oxide.

Test N° 46:

This test, illustrating the invention, uses a polymer which, after 100% neutralisation by soda, is a polymer which has a specific viscosity of 7.53 and is made up, by percentage weight, of:
85% of acrylic acid
5% of methacrylic acid
10% of tristyryl phenol methacrylate ethoxylated with 25 moles of ethylene oxide. Test N° 47:

This test, illustrating the invention, uses a polymer which, after 100% neutralisation by soda, is a polymer which has a specific viscosity of 5.58 and is made up, by percentage weight, of:
85% of acrylic acid
5% of itaconic acid
10% of tristyryl phenol methacrylate ethoxylated with 25 moles of ethylene oxide.

Test N° 48:

This test, illustrating the invention, uses a polymer which, after 100% neutralisation by soda, is a polymer which has a specific viscosity of 7.16 and is made up, by percentage weight, of:
85% of acrylic acid
5% of maleic acid
10% of -tristyryl phenol methacrylate ethoxylated with 25 moles of ethylene oxide.

Test N° 49:

This test, illustrating the invention, uses a polymer which, after 100% neutralisation by soda, is a polymer which has a specific viscosity of 6.68 and is made up, by percentage weight, of:
85% of acrylic acid
5% of acrylamido-methyl-propane-sulphonic acid
10% of tristyryl phenol methacrylate ethoxylated with 25 moles of ethylene oxide.

Test N° 50:

This test, illustrating the invention, uses a polymer which, after 100% neutralisation by soda, is a polymer which has a specific viscosity of 4.38 and is made up, by percentage weight, of:
85% of acrylic acid
5% of acrylamide
10% of tristyryl phenol methacrylate ethoxylated with 25 moles of ethylene oxide.

Test N° 51:

This test, illustrating the invention, uses a polymer which, after 100% neutralisation by soda, is a polymer which has a specific viscosity of 5.71 and is made up, by percentage weight, of:
85% of acrylic acid
5% of ethylene glycol methacrylate phosphate
10% of tristyryl phenol methacrylate ethoxylated with 25 moles of ethylene oxide.

Test N° 52:

This test, illustrating the invention, uses a polymer which, after 100% neutralisation by soda, is a polymer which has a specific viscosity of 5.49 and is made up, by percentage weight, of:
80% of acrylic acid
2% of ethyl acrylate
8% of methacrylic acid
10% of methacrylurethane of the general formula (I) in which the hydrophobic radical R' is a tristyrylphenyl radical, m and p are equal to 0, q=1 and n equals 25.

Test N° 53:

This test, illustrating the invention, uses a polymer which, after 100% neutralisation by soda, is a polymer which has a specific viscosity of 1.94 and is made up, by percentage weight, of:
90% of acrylic acid
10% of tristyryl phenol methacrylate ethoxylated with 25 moles of ethylene oxide.

Test N° 54:

This test, illustrating the invention, uses a polymer which, after 100% neutralisation by soda, is a polymer which has a specific viscosity of 2.66 and is made up, by percentage weight, of:
90% of acrylic acid
10% of tristyryl phenol methacrylate ethoxylated with 25 moles of ethylene oxide.

Test N° 55:

This test, illustrating the invention, uses a polymer which, after 100% neutralisation by soda, is a polymer which has a specific viscosity of 3.38 and is made up, by percentage weight, of:
90% of acrylic acid
10% of tristyryl phenol methacrylate ethoxylated with 25 moles of ethylene oxide.

Test N° 56:

This test, illustrating the invent on, uses a polymer which, after 100% neutralisation by soda, is a polymer which has a specific viscosity of 12.04 and is made up, by percentage weight, of:
90% of acrylic acid
10% of tristyryl phenol methacrylate ethoxylated with 25 moles of ethylene oxide.

Test N° 57:

This test, illustrating the invention, uses a polymer neutralised, in molar percentage, 75% by soda and 25% by lime, having a specific viscosity of 4.35 and made up, by percentage weight, of:
90% of acrylic acid
10% of tristyryl phenol methacrylate ethoxylated with 25 moles of ethylene oxide.

Test N° 58:

This test, illustrating the invention, uses a polymer neutralised, in molar percentage, 50% by soda and 50% by lime, having a specific viscosity of 4.35 and made up, by percentage weight, of:
90% of acrylic acid
10% of tristyryl phenol methacrylate ethoxylated with 25 moles of ethylene oxide.

Test N° 59:

This test, illustrating the invention, uses a polymer neutralised, in molar percentage, 25% by soda and 75% by lime having a specific viscosity of 4.35 and made up, by percentage weight, of:

90% of acrylic acid

10% of tristyryl phenol methacrylate ethoxylated with 25 moles of ethylene oxide.

Test N° 60:

This test, illustrating the invention, uses a polymer neutralised, in molar percentage, 75% by soda and 25% by magnesium hydroxide, having a specific viscosity of 4.35 and made up, by percentage weight, of:

90% of acrylic acid

10% of tristyryl phenol methacrylate ethoxylated with 25 moles of ethylene oxide.

Test N° 61:

This test, illustrating the invention, uses a polymer neutralised 100% by potash, having a specific viscosity of 4.35 and made up, by percentage weight, of:

90% of acrylic acid

10% of tristyryl phenol methacrylate ethoxylated with 25 moles of ethylene oxide.

Test N° 62:

This test, illustrating the invention, uses a polymer neutralised 100% by ammonia, having a specific viscosity of 4.35 and made up, by percentage weight, of:

90% of acrylic acid

10% of tristyryl phenol methacrylate ethoxylated with 25 moles of ethylene oxide.

The results of all the tests are set out in tables 3.1 and 3.2 below.

TABLE 3.1

| | Test No. | Brookfield viscosity in mPa · s | |
|---|---|---|---|
| | | 10 r/min | 100 r/min |
| Prior art | 33 | Impossible | Impossible |
| Prior art | 34 | 700 | 270 |
| Invention | 35 | 2840 | 1290 |
| Invention | 36 | 800 | 950 |
| Invention | 37 | 840 | 560 |
| Invention | 38 | 1160 | 800 |
| Invention | 39 | 540 | 730 |
| Invention | 40 | 440 | 515 |
| Invention | 41 | 1360 | 1000 |
| Invention | 42 | 280 | 260 |
| Invention | 43 | 200 | 185 |
| Invention | 44 | 320 | 290 |
| Invention | 45 | 880 | 510 |
| Invention | 46 | 1280 | 570 |
| Invention | 47 | 1050 | 550 |
| Invention | 48 | 1600 | 635 |
| Invention | 49 | 1480 | 640 |
| Invention | 50 | 400 | 260 |
| Invention | 51 | 1400 | 630 |

TABLE 3.2

| | Test No. | Brookfield viscosity in mPa · s | |
|---|---|---|---|
| | | 10 r/min | 100 r/min |
| Invention | 52 | 1360 | 1000 |
| Invention | 53 | 400 | 460 |
| Invention | 54 | 460 | 470 |
| Invention | 55 | 840 | 600 |
| Invention | 56 | 2160 | 830 |
| Invention | 57 | 350 | 170 |
| Invention | 58 | 680 | 390 |
| Invention | 59 | 480 | 350 |

TABLE 3.2-continued

| | Test No. | Brookfield viscosity in mPa · s | |
|---|---|---|---|
| | | 10 r/min | 100 r/min |
| Invention | 60 | 720 | 380 |
| Invention | 61 | 1450 | 710 |
| Invention | 62 | 700 | 390 |

Tables 3.1 and 3.2 highlight the fact that aqueous suspensions of talc can be produced by the invention having low Brookfield viscosities at a high concentration of dry substance.

The tables also show that the use of a polyacrylate commonly used to place mineral substances with a hydrophilic substance in suspension will not allow talc suspensions of a low Brookfield viscosity to be produced.

EXAMPLE 5

As with the preceding example, this example relates to the use of a copolymer in which at least one of the monomers has a surface-active structure to prepare aqueous suspensions of talc but in a different quantity.

To this end and using the same operating method and the same equipment as those used in the preceding example, the Finntalc C10 sold by Finnminerals is mixed with a quantity of water necessary to produce a suspension with a 65% concentration of dry substance and a quantity of copolymer to be tested corresponding to 1.0% by dry weight of dry acid copolymer relative to the total weight of dry substance present in the suspension.

Test N° 63:

This test, illustrating the prior art, uses a sodium polyacrylate with a specific viscosity of 0.45.

It could not be placed in suspension since the agitator became blocked due to too high a viscosity.

Test N° 64:

This test, illustrating the invention, uses a polymer which, after 100% neutralisation by soda, is a polymer which has a specific viscosity of 24 and is made up, by percentage weight, of:

85% of acrylic acid

15% of tristyryl phenol methacrylate ethoxylated with 25 moles of ethylene oxide.

Test N° 65:

This test, illustrating the invention, uses a polymer which, after 100% neutralisation by soda, is a polymer which has a specific viscosity of 19 and is made up, by percentage weight, of:

80% of acrylic acid

20% of tristyryl phenol methacrylate ethoxylated with 25 moles of ethylene oxide and oxypropylated with 13 moles of propylene oxide.

Test N° 66:

This test, illustrating the invention, uses a polymer made up, by percentage weight, of:

70% of acrylic acid

30% of tristyryl phenol methacrylate ethoxylated with 25 moles of ethylene oxide.

Test N° 67:

This test, illustrating the invention, uses a polymer made up, by percentage weight, of:

60% of acrylic acid

40% of tristyryl phenol methacrylate ethoxylated with 25 moles of ethylene oxide.

Test N° 68:

This test, illustrating the invention, uses a polymer which, after 100% neutralisation by soda, is a polymer which has a specific viscosity of 4.47 and is made up, by percentage weight, of:

50% of acrylic acid

10% of tristyryl phenol methacrylate ethoxylated with 25 moles of ethylene oxide 40% of acrylamido-2-methyl-2-propane sulphonic acid.

Test N° 69:

This test, illustrating the invention, uses a polymer which, after 100% neutralisation by soda, is a polymer which has a specific viscosity of 3.0 and is made up, by percentage weight, of:

50% of acrylic acid

10% of tristyryl phenol methacrylate ethoxylated with 25 moles of ethylene oxide 40% ethylene glycol methacrylate phosphate.

Test N° 70:

This test, illustrating the invention, uses a polymer which, after 100% neutralisation by soda, is a polymer which has a specific viscosity of 3.67 and is made up, by percentage weight, of:

40% of acrylic acid

10% of tristyryl phenol methacrylate ethoxylated with 25 moles of ethylene oxide 50% of acrylamide.

The results of all the tests are set out in table 4 below:

TABLE 4

| | Test No. | Brookfield viscosity in mPa · s | |
|---|---|---|---|
| | | 10 r/min | 100 r/min |
| Prior art | 63 | Impossible | Impossible |
| Invention | 64 | 1000 | 305 |
| Invention | 65 | 500 | 180 |
| Invention | 66 | 1080 | 280 |
| Invention | 67 | 780 | 220 |
| Invention | 68 | 280 | 200 |
| Invention | 69 | 200 | 160 |
| Invention | 70 | 165 | 175 |

Table 4 highlights the fact that the invention is capable of producing aqueous suspensions of talc with low Brookfield viscosities at a high concentration of dry substance.

It also demonstrates that using polyacrylate such as commonly used to place mineral substances with a hydrophilic surface in suspension will not produce talc suspensions with a low Brookfield viscosity.

EXAMPLE 6

This example relates to the use of a copolymer, in which at least one of the monomers has a surface-active structure, to prepare aqueous suspensions of mica.

To this end, using the same operating method and the same equipment as those used in example 1, the mica, sold under the name of Ascoat 30 by Jungbunzlauer GmbH, is mixed with a quantity of water necessary to obtain a suspension with a 68% concentration of dry substance and a quantity of copolymer to be tested corresponding to 0.6% by dry weight of dry copolymer relative to the total weight of dry substance present in the suspension.

Test N° 71:

This test, illustrating the prior art, uses a copolymer 100% neutralised by soda having a specific viscosity of 4.7 and made up, by percentage weight, of 90% acrylic acid and 10% methacrylate of lauric alcohol ethoxylated with 23 moles of ethylene oxide.

Test N° 72:

This test, illustrating the prior art, uses a copolymer 100% neutralised by soda having a specific viscosity of 4.66 and made up, by percentage weight, of 90% acrylic acid and 10% nonyl phenol methacrylate ethoxylated with 30 moles of ethylene oxide.

Test N° 73:

This test, illustrating the invention, uses a polymer neutralised 100% by soda, having a specific viscosity of 4.0 and made up, by percentage weight, of:

90% of acrylic acid

10% of tristyryl phenol methacrylate ethoxylated with 8 moles of ethylene oxide and oxypropylated with 13 moles of propylene oxide.

Test N° 74:

This test, illustrating the invention, uses a polymer neutralised 100% by soda, having a specific viscosity of 4.35 and made up, by percentage weight, of:

90% of acrylic acid

10% of tristyryl phenol methacrylate ethoxylated with 25 moles of ethylene oxide.

Test N° 75:

This test, illustrating the invention, uses a polymer neutralised 100% by soda, having a specific viscosity of 4.38 and made up, by percentage weight, of:

90% of acrylic acid

10% of tristyryl phenol methacrylate ethoxylated with 40 moles of ethylene oxide.

Test N° 76:

This test, illustrating the invention, uses a polymer neutralised 100% by soda, having a specific viscosity of 4.43 and made up, by percentage weight, of:

90% of acrylic acid

10% of tristyryl phenol methacrylate ethoxylated with 60 moles of ethylene oxide.

Test N° 77:

This test, illustrating the invention, uses a polymer neutralised 100% by soda, having a specific viscosity of 2.54 and made up, by percentage weight, of:

95% of acrylic acid

5% of methacrylurethane of general formula (I) in which the hydrophobic radical R' is a linear alkyl group with 22 carbon atoms, m and p are equal to 0, q=1 and n equals 25.

Test N° 78:

This test, illustrating the invention, uses a polymer neutralised 100% by soda, having a specific viscosity of 1.52 and made up, by percentage weight, of:

95% of acrylic acid

5% of methacrylate of general formula (I) in which the hydrophobic radical R' is a —N—(R"R'") group where R" and R'" are linear alkyl chains with 12 carbon atoms, m and p are equal to 0, q=2 and n equals 25.

Test N° 79:

This test, illustrating the invention, uses a polymer neutralised 100% by soda, having a specific viscosity of 2.47 and made up, by percentage weight, of:

95% of acrylic acid

5% of methacrylurethane of general formula (I) in which the hydrophobic radical R' is a branched alkyl group with 28 carbon atoms, m and p are equal to 0, q=1 and n equals 25.

Test N° 80:

This test, illustrating the invention, uses a polymer neutralised 100% by soda, having a specific viscosity of 1.79 and made up, by percentage weight, of:

95% of acrylic acid

5% of methacrylurethane of general formula (I) in which the hydrophobic radical R' is a branched alkyl group with 30 carbon atoms, m and p are equal to 0, q=1 and n equals 25.

Test N° 81:

This test, illustrating the invention, uses a polymer neutralised 100% by soda, having a specific viscosity of 2.59 and made up, by percentage weight, of:

90% of acrylic acid

10% of methacrylate of general formula (I) in which the hydrophobic radical R' is a branched alkyl group with 32 carbon atoms, m and p are equal to 0, q=1 and n equals 25.

Test N° 82:

This test, illustrating the invention, uses a polymer neutralised 100% by soda, having a specific viscosity of 3.02 and made up, by percentage weight, of:

97% of acrylic acid

3% of tristyryl phenol methacrylate ethoxylated with 25 moles of ethylene oxide.

Test N° 83:

This test, illustrating the invention, uses a polymer neutralised 100% by soda, having a specific viscosity of 3.94 and made up, by percentage weight, of:

93% of acrylic acid

7% of tristyryl phenol methacrylate ethoxylated with 25 moles of ethylene oxide.

Test N° 84:

This test, illustrating the invention, uses a polymer neutralised 100% by soda, having a specific viscosity of 3.74 and made up, by percentage weight, of:

85% of acrylic acid

15% of tristyryl phenol methacrylate ethoxylated with 25 moles of ethylene oxide.

Test N° 85:

This test, illustrating the invention, uses a polymer neutralised 100% by soda, having a specific viscosity of 4.38 and made up, by percentage weight, of:

85% of acrylic acid

5% of acrylamide

10% of tristyryl phenol methacrylate ethoxylated with 25 moles of ethylene oxide.

Test N° 86:

This test, illustrating the invention, uses a polymer neutralised 100% by soda, having a specific viscosity of 0.67 and made up, by percentage weight, of:

95% of acrylic acid

5% of tristyryl phenol methacrylate ethoxylated with 25 moles of ethylene oxide.

Test N° 87:

This test, illustrating the invention, uses a polymer neutralised 100% by soda, having a specific viscosity of 1.94 and made up, by percentage weight, of:

90% of acrylic acid

10% of tristyryl phenol methacrylate ethoxylated with 25 moles of ethylene oxide.

Test N° 88:

This test, illustrating the invention, uses a polymer neutralised 100% by soda, having a specific viscosity of 2.66 and made up, by percentage weight, of:

90% of acrylic acid

10% of tristyryl phenol methacrylate ethoxylated with 25 moles of ethylene oxide.

All the test results are set out in table 5 below:

TABLE 5

| Test | Test No. | Brookfield viscosity in mPa · s | |
|---|---|---|---|
| | | 10 r/min | 100 r/min |
| Prior art | 71 | 5200 | 1800 |
| Prior art | 72 | 5200 | 1600 |
| Invention | 73 | 1500 | 560 |
| Invention | 74 | 2550 | 940 |
| Invention | 75 | 3400 | 1300 |
| Invention | 76 | 2500 | 440 |
| Invention | 77 | 1250 | 770 |
| Invention | 78 | 1400 | 500 |
| Invention | 79 | 1100 | 440 |
| Invention | 80 | 1000 | 400 |
| Invention | 81 | 800 | 420 |
| Invention | 82 | 2800 | 1000 |
| Invention | 83 | 2000 | 1300 |
| Invention | 84 | 1000 | 440 |
| Invention | 85 | 1700 | 720 |
| Invention | 86 | 1550 | 670 |
| Invention | 87 | 1400 | 740 |
| Invention | 88 | 2300 | 1030 |

Table 5 highlights the fact that the invention can be used to obtain aqueous suspensions of mica with low Brookfield viscosities at a high concentration of dry substance.

The table also shows that aqueous suspensions of mica with a low Brookfield viscosity can not be obtained using a copolymer of the prior art.

EXAMPLE 7

This example relates to the use of a copolymer, in which at least one of the monomers has a surface-active structure, to prepare aqueous suspensions of kaolin.

To this end, using the same operating method and the same equipment as those used in example 1, the kaolin, sold under the name of SPS by ECC, is mixed with a quantity of water necessary to obtain a suspension with a 66% concentration of dry substance and a quantity of copolymer to be tested corresponding to 0.52% by dry weight of dry acid copolymer relative to the total weight of dry substance present in the suspension.

Test N° 89:

This test, illustrating the prior art, uses a sodium polyacrylate with a specific viscosity of 0.45.

Test N° 90:

This test, illustrating the invention, uses a polymer neutralised 100% by soda, having a specific viscosity of 0.40 and made up, by percentage weight, of:

95% of acrylic acid

5% of tristyryl phenol methacrylate ethoxylated with 25 moles of ethylene oxide.

Test N° 91:

This test, illustrating the invention, uses a polymer neutralised 100% by soda, having a specific viscosity of 0.42 and made up, by percentage weight, of:

95% of acrylic acid

5% of methacrylate of general formula (I) in which the hydrophobic radical R' is a branched alkyl group with 32 carbon atoms, m and p are equal to 0, q=1 and n equals 25.

The results of the tests are set out in table 6 below:

TABLE 6

| Test No. | Brookfield viscosity in mPa · s | |
|---|---|---|
| | 10 r/min | 100 r/min |
| Prior art 89 | 4000 | 850 |
| Invention 90 | 3720 | 840 |
| Invention 91 | 3700 | 710 |

Table 6 highlights the fact that the invention can be used to produce aqueous suspensions of kaolin with low Brookfield viscosities at a high concentration of dry substance.

EXAMPLE 8

This example relates to the use of a copolymer, in which at least one of the monomers has a surface-active structure, to prepare aqueous suspensions of mixtures of mineral substances regardless of whether they have a hydrophilic or hydrophobic surface.

Test N° 92:

This test illustrates the invention and consists in preparing in parallel an aqueous suspension of calcium carbonate and an aqueous suspension of kaolin, then forming a mixture of equal weight of dry substance of the two aqueous suspensions produced.

To this end, using a marble from a Norwegian deposit in which the grain size is such that 60% of the particles are of a diameter of less than 2 micrometers, a calcium carbonate suspension is made up by introducing, by pouring and under agitation, a quantity of said marble needed to make up a suspension with a 70% concentration of dry substance, into a two-liter beaker fitted with a Pendraulik agitator and containing water. This beaker also contains a quantity of copolymer to be tested corresponding to 0.5% by weight of dry acid copolymer relative to the total weight of dry substance present in the suspension.

The copolymer used in this test is a polymer which, after 100% neutralisation by soda, is a polymer with a specific viscosity of 4.35 and made up, by percentage weight, of:
90% acrylic acid
10% of tristyryl phenol methacrylate ethoxylated with 25 moles of ethylene oxide.

In the same manner and using the same material, an aqueous suspension of kaolin (sold under the name SPS by ECC) is prepared simultaneously, having a concentration of 63% dry substance and a content of copolymer to be tested of 0.5% by acid dry weight relative to the total weight of dry substance present in the suspension.

After agitating these two suspensions for 20 minutes, they are mixed by pouring them into a beaker, 714.3 grams of the one and 793.7 grams of the other, to produce an aqueous suspension which is 50% by dry weight of calcium carbonate and 50% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1900 mPa.s.

The aqueous suspension obtained in accordance with the invention is therefore a mixed suspension (50%/50% by dry weight) of calcium carbonate and kaolin which is easy to handle at a high concentration of dry substance (66.3%).

Test N° 93:

This test illustrates the invention and consists in preparing in parallel an aqueous suspension of calcium carbonate and an aqueous suspension of kaolin, then forming a mixture to produce a suspension of 70% by dry weight of calcium carbonate and 30% by dry weight of kaolin.

To this end, using a marble from a Norwegian deposit in which the grain size is such that 60% of the particles are of a diameter of less than 2 micrometers, a calcium carbonate suspension is made up by introducing, by pouring and under agitation, a quantity of said marble needed to make up a suspension with a 70% concentration of dry substance, into a two-liter beaker fitted with a Pendraulik agitator and containing water. This beaker also contains a quantity of copolymer to be tested corresponding to 0.5% by weight of dry acid copolymer relative to the total weight of dry substance present in the suspension.

The copolymer used in this test is a polymer which, after 100% neutralisation by soda, is a polymer with a specific viscosity of 4.35 and made up, by percentage weight, of:
90% acrylic acid
10% of tristyryl phenol methacrylate ethoxylated with 25 moles of ethylene oxide.

In the same manner and using the same material, an aqueous suspension of kaolin (sold under the name SPS by ECC) is prepared simultaneously, having a concentration of 63% dry substance and a content of copolymer to be tested of 0.5% by acid dry weight relative to the total weight of dry substance present in the suspension.

After agitating these two suspensions for 20 minutes, they are mixed by pouring them into a beaker, 1000 grams of the one and 476.2 grams of the other, to produce an aqueous suspension which is 70% by dry weight of calcium carbonate and 30% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1100 mPa.s.

The aqueous suspension obtained in accordance with the invention is therefore a mixed suspension (70%/30% by dry weight) of calcium carbonate and kaolin which is easy to handle at a high concentration of dry substance (67.7%).

Test N° 94:

This test illustrates the invention and consists in preparing in parallel an aqueous suspension of kaolin and an aqueous suspension of mica, then forming a mixture to obtain a suspension of 50% by dry weight of kaolin and 50% by dry weight of mica.

To this end, an aqueous suspension of kaolin is prepared by introducing, by pouring and under agitation, a quantity of kaolin (marketed under the name of SPS by ECC) needed to make up a suspension with a 65.1% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 2.54 and made up, by percentage weight, of:
95% acrylic acid
5% of methacrylurethane of the general formula (I) in which the hydrophobic radical R' is a linear alkyl group with 22 carbon atoms, m and p are equal to 0, q=1 and n equals 25.

In the same manner and using the same material, an aqueous suspension of mica (sold under the name Ascoat 30 by Jungbunzlauer GmbH) is prepared simultaneously, having a concentration of 67.4% dry substance and a content of copolymer to be tested of 0.6% by dry weight relative to the total weight of dry substance present in the suspension.

After agitating these two suspensions for 20 minutes, they are mixed by pouring them into a beaker, 760 grams of the one and 742 grams of the other, to produce an aqueous suspension which is 50% by dry weight of kaolin and 50% by dry weight of mica.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 732 mpa.s.

The aqueous suspension obtained in accordance with the invention is therefore a mixed suspension (50%/50% by dry weight) of kaolin and mica which is easy to handle at a high concentration of dry substance (66.2%).

Test N° 95:

This test illustrates the invention and consists in preparing in parallel an aqueous suspension of kaolin and an aqueous suspension of mica, then forming a mixture to obtain a suspension of 75% by dry weight of kaolin and 25% by dry weight of mica.

To this end, an aqueous suspension of kaolin is prepared by introducing, by pouring and under agitation, a quantity of kaolin (marketed under the name of SPS by ECC) needed to make up a suspension with a 65.1% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 2.54 and made up, by percentage weight, of:
95% acrylic acid
5% of methacrylurethane of the general formula (I) in which the hydrophobic radical R' is a linear alkyl group with 22 carbon atoms, m and p are equal to 0, q=1 and n equals 25.

In the same manner and using the same substance, an aqueous suspension of mica (sold under the name Ascoat 30 by Jungbunzlauer GmbH) is prepared simultaneously, having a concentration of 67.4% dry substance and a content of copolymer to be tested of 0.6% by dry weight relative to the total weight of dry substance present in the suspension.

After agitating these two suspensions for 20 minutes, they are mixed by pouring them into a beaker, 1152 grams of the one and 371 grams of the other, to produce an aqueous suspension which is 75% by dry weight of kaolin and 25% by dry weight of mica.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1380 mPa.s.

The aqueous suspension obtained in accordance with the invention is therefore a mixed suspension (75%/25% by dry weight) of kaolin and mica which is easy to handle at a high concentration of dry substance (65.6%).

Test N° 96:

This test illustrates the invention and consists in preparing in parallel an aqueous suspension of talc and an aqueous suspension of kaolin, then forming a mixture to obtain a suspension of 75% by dry weight of talc and 25% by dry weight of kaolin.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by dry weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
85% acrylic acid
5% of acrylamide
10% of tristyryl phenol methacrylate ethoxylated with 25 moles of ethylene oxide.

In the same manner and using the same substance, an aqueous suspension of kaolin (sold under the name of SPESWHITE by ECC) is prepared simultaneously, having a concentration of 65.1% dry substance and a content of copolymer to be tested of 1.0% by dry weight relative to the total weight of dry substance present in the suspension.

After agitating these two suspensions for 20 minutes, they are mixed by pouring them into a beaker, 1155.6 grams of the one and 384 grams of the other, to produce an aqueous suspension which is 75% by dry weight of talc and 25% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1230 mpa.s.

The aqueous suspension obtained in accordance with the invention is therefore a mixed suspension (75%/25% by dry weight) of talc and kaolin which is easy to handle at a high concentration of dry substance (65.0%).

Test N° 97:

This test illustrates the invention and consists in preparing in parallel an aqueous suspension of talc and an aqueous suspension of kaolin, then forming a mixture to obtain a suspension of 50% by dry weight of talc and 50% by dry weight of kaolin.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
85% acrylic acid
5% of acrylamide
10% of tristyryl phenol methacrylate ethoxylated with 25 moles of ethylene oxide.

In the same manner and using the same material, an aqueous suspension of kaolin (sold under the name of SPESWHITE by ECC) is prepared simultaneously, having a concentration of 65.1% dry substance and a content of copolymer to be tested of 1.0% by dry acid weight relative to the total weight of dry substance present in the suspension.

After agitating these two suspensions for 20 minutes, they are mixed by pouring them into a beaker, 770.5 grams of the one and 768 grams of the other, to produce an aqueous suspension which is 50% by dry weight of talc and 50% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 2380 mpa.s.

The aqueous suspension obtained in accordance with the invention is therefore a mixed suspension (50%/50% by dry weight) of talc and kaolin which is easy to handle at a high concentration of dry substance (65.0%).

Test N° 98:

This test illustrates the invention and consists in preparing in parallel an aqueous suspension of talc and an aqueous suspension of kaolin, then forming a mixture to obtain a suspension of 25% by dry weight of talc and 75% by dry weight of kaolin.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
85% acrylic acid
5% of acrylamide
10% of tristyryl phenol methacrylate ethoxylated with 25 moles of ethylene oxide.

In the same manner and using the same equipment, an aqueous suspension of kaolin (sold under the name of SPESWHITE by ECC) is prepared simultaneously, having a concentration of 65.1% dry substance and a content of copolymer to be tested of 1.0% by dry weight relative to the total weight of dry substance present in the suspension.

After agitating these two suspensions for 20 minutes, they are mixed by pouring them into a beaker, 385.2 grams of the one and 1152 grams of the other, to produce an aqueous suspension which is 25% by dry weight of talc and 75% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1860 mpa.s.

The aqueous suspension obtained in accordance with the invention is therefore a mixed suspension (25%/75% by dry weight) of talc and kaolin which is easy to handle at a high concentration of dry substance (65.0%).

Test N° 99:

This test illustrates the invention and consists in preparing in parallel an aqueous suspension of talc and an aqueous suspension of calcium carbonate, then forming a mixture to obtain a suspension of 75% by dry weight of talc and 25% by dry weight of calcium carbonate.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
85% acrylic acid
5% of acrylamide
10% of tristyryl phenol methacrylate ethoxylated with 25 moles of ethylene oxide.

In the same manner and using the same equipment, an aqueous suspension of calcium carbonate is prepared simultaneously, using a marble from a Norwegian deposit with a grain size such that 75% of the particles are of a diameter of less than 1 micrometer, having a concentration of 65% dry substance and a content of copolymer to be tested of 1.0% by dry acid weight relative to the total weight of dry substance present in the suspension.

After agitating these two suspensions for 20 minutes, they are mixed by pouring them into a beaker, 1155.5 grams of the one and 384.6 grams of the other, to produce an aqueous suspension which is 75% by dry weight of talc and 25% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 150 mpa.s.

The aqueous suspension obtained in accordance with the invention is therefore a mixed suspension (75%/25% by dry weight) of talc and calcium carbonate which is easy to handle at a high concentration of dry substance (65.0%), and is so using a single dispersant.

Test N° 100:

This test illustrates the invention and consists in preparing in parallel an aqueous suspension of talc and an aqueous suspension of calcium carbonate, then forming a mixture to obtain a suspension of 50% by dry weight of talc and 50% by dry weight of calcium carbonate.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
85% acrylic acid
5% of acrylamide
10% of tristyryl phenol methacrylate ethoxylated with 25 moles of ethylene oxide.

In the same manner and using the same equipment, an aqueous suspension of calcium carbonate is prepared simultaneously, using a marble from a Norwegian deposit with a grain size such that 75% of the particles are of a diameter of less than 1 micrometer, having a concentration of 65% dry substance and a content of copolymer to be tested of 1% by dry acid weight relative to the total weight of dry substance present in the suspension.

After agitating these two suspensions for 20 minutes, they are mixed by pouring them into a beaker, 770.4 grams of the one and 769.2 grams of the other, to produce an aqueous suspension which is 50% by dry weight of talc and 50% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 350 mPa.s.

The aqueous suspension obtained in accordance with the invention is therefore a mixed suspension (50%/50% by dry weight) of talc and calcium carbonate which is easy to handle at a high concentration of dry substance (65.0%), and is so using a single dispersant.

Test N° 101:

This test illustrates the invention and consists in preparing in parallel an aqueous suspension of talc and an aqueous suspension of calcium carbonate, then forming a mixture to obtain a suspension of 25% by dry weight of talc and 75% by dry weight of calcium carbonate.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
85% acrylic acid
5% of acrylamide
10% of tristyryl phenol methacrylate ethoxylated with 25 moles of ethylene oxide.

In the same manner and using the same equipment, an aqueous suspension of calcium carbonate is prepared simultaneously, using a marble from a Norwegian deposit with a grain size such that 75% of the particles are of a diameter of less than 1 micrometer, having a concentration of 65% dry substance and a content of copolymer to be tested of 1% by dry weight relative to the total weight of dry substance present in the suspension.

After agitating these two suspensions for 20 minutes, they are mixed by pouring them into a beaker, 385.2 grams of the one and 1153.8 grams of the other, to produce an aqueous suspension which is 25% by dry weight of talc and 75% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 220 mPa.s.

The aqueous suspension obtained in accordance with the invention is therefore a mixed suspension (25%/75% by dry weight) of talc and calcium carbonate which is easy to handle at a high concentration of dry substance (65.0%), and is so using a single dispersant.

Test N° 102:

This test illustrates the invention and consists in preparing directly a mixed aqueous suspension of 50% by dry weight of calcium carbonate and 50% by dry weight of talc.

To this end, starting with a marble from a Norwegian deposit with a grain size such that 60% of the particles are of a diameter of less than 2 micrometers and from a talc (marketed under the name of Finntalc C10 by Finnminerals), a mixed aqueous suspension of calcium carbonate and talc is prepared by introducing, by pouring and under agitation, a same quantity of said marble and said talc needed to make up a suspension with a 65% concentration of dry substance, into a two-liter beaker fitted with a Pendraulik agitator and containing water. This beaker also contains a quantity of copolymer to be tested corresponding to 2.0% by weight of dry acid copolymer relative to the total weight of dry substance present in the suspension.

The copolymer used in this test is a polymer which, after 100% neutralisation by soda, is a polymer with a specific viscosity of 4.35 and made up, by percentage weight, of:
90% acrylic acid
10% of tristyryl phenol methacrylate ethoxylated with 25 moles of ethylene oxide.

After agitating the mixture for 20 minutes, the Brookfield viscosity (To) is measured, at ambient temperature, using a Brookfield viscometer of the DVII type at 100 r/min using the appropriate spindle. The measured Brookfield viscosity is 350 mpa.s. 68

The aqueous suspension obtained in accordance with the invention is therefore a mixed suspension (50%/50% by dry weight) of calcium carbonate and talc which is easy to handle at a high concentration of dry substance (65%).

EXAMPLE 9

This example relates to the use of a copolymer, in which at least one of the monomers has a surface-active structure, to prepare a suspension of coarse calcium carbonate for crushing so that it can be refined to a micro-particulate suspension. To this end, a suspension of coarse calcium carbonate was prepared from a natural calcium carbonate marketed under the name of BL 200 by OMYA S. A., using the various crushing agents to be tested:

Test N° 103:

This test, illustrating the invention, uses a polymer neutralised 100% by soda, having a specific viscosity of 0.67 and made up, by percentage weight, of:
95% of acrylic acid
5% of methacrylate of general formula (I) in which the hydrophobic radical R' is a branched alkyl group with 32 carbon atoms, m and p are equal to 0, q=1 and n equals 25. Test N° 104:

This test, illustrating the invention, uses a polymer neutralised 100% by soda, having a specific viscosity of 4.6 and made up, by percentage weight, of:
90% of acrylic acid
10% of tristyrylphenol methacrylate ethoxylated with 25 moles of ethylene oxide.

For each test, an aqueous suspension of calcium carbonate from the Orgon deposit (France) is prepared, having a grain size such that 19% of the particles are of a diameter of less than 2 micrometers.

The aqueous suspension has a concentration of dry substance of 76% by weight relative to the total weight.

The crushing agent is introduced into this suspension in the quantities indicated in the table below, expressed as a percentage by dry weight relative to the weight of dry calcium carbonate to be crushed.

The suspension circulates in a crusher of the Dyno-Mill type with a fixed cylinder and rotating impeller, the crushing medium of which is corundum balls of a diameter ranging between 0.6 millimeter and 1.0 millimeter.

The total volume occupied by the crushing medium is 1 150 cubic centimeters whilst its weight is 2 900 g.

The volume of the crushing chamber is 1 400 cubic centimeters.

The circumferential speed of the crusher is 10 meters per second.

The calcium carbonate suspension is recycled at a rate of 18 liters per hour.

The output of the Dyno-Mill crusher is fitted with a separator with a mesh size of 200 micrometers so that the suspension resulting from crushing and the crushing medium can be separated.

The temperature during each crushing test is maintained at approximately 60° C.

At the end of crushing, a sample of the refined pigment suspension is drawn off into a flask and the viscosity is measured by means of a Brookfield viscometer of the RVT type at a temperature of 20° C. and rotation speeds of 10 revolutions per minute and 100 revolutions per minute using the appropriate spindle.

The grain size is determined by measurement using a Sedigraph 5100 produced by Micromeritics.

The results of all the experiments are set out in table 7 below.

TABLE 7

| Test No. | Crushing agent used | | Grain size % <1 μm | Brookfield viscosity in mPa · s | |
|---|---|---|---|---|---|
| | Specific viscosity | Consumption % dry/dry | | 10 r/min | 100 r/min |
| Invention 103 | 0.67 | 1.27 | 31 | 8100 | 1250 |
| Invention 104 | 4.6 | 1.1 | 45 | 8500 | 2040 |

Table 7 demonstrates that aqueous suspensions of refined calcium carbonate can be obtained with a high concentration of dry substance.

EXAMPLE 10

This example relates to the use of a copolymer, in which at least one of the monomers has a surface-active structure, to prepare an aqueous suspension of coarse mica (marketed by Jungbunzlauer GmbH under the name of ASCOAT 30, with a grain size such that 18% of the particles are of a diameter of less than 1 micrometer) in readiness for refining to a micro-particulate suspension.

Test N° 105:

This test, illustrating the invention, uses, along with the same equipment and the same operating method as those of example 9 with the exception of the dry substance of the suspension, which is equal to 65%, a polymer 100% neutralised by soda having a specific viscosity of 1.85 and made up, by percentage weight, of:

95% acrylic acid

5% of methacrylate of general formula (I) in which the hydrophobic radical RI is a branched alkyl group with 32 carbon atoms, m and p are equal to 0, q=1 and n equals 25.

The results obtained are set out in table 8 below:

TABLE 8

| Test No. | Crushing agent used | | Grain size % <1 μm | Brookfield viscosity in mPa · s | |
|---|---|---|---|---|---|
| | Specific viscosity | Consumption % dry/dry | | 10 r/min | 100 r/min |
| Invention 105 | 1.85 | 0.70 | 36.1 | 25000 | 4100 |

Table 8 demonstrates that refined aqueous suspensions of mica can be obtained at a high concentration of dry substance, which is not possible using an agent of the prior art.

Obviously, numerous modifications and variations of the present invention are possible in light of the above teachings. It is therefore to be understood that within the scope of the appended claims, the invention may be practiced otherwise than as specifically described herein.

The present application is based on French Patent Application No. 97 09387, filed Jul. 18, 1997, and incorporated herein by reference in its entirety.

What is claimed is:

1. A method of dispersing mineral substances in aqueous media, comprising combining:

water, at least one mineral substance, and a copolymer which comprises the following monomers in polymerized form:

(a) at least one ethylenically unsaturated monomer having at least one carboxyl function, (b) optionally, at least one ethylenically unsaturated monomer having at least one sulphonic function and/or phosphoric function, (c) optionally, at least one ethylenically unsaturated monomer having no carboxyl function, and (d) at least one ethylenically unsaturated oxyalkylated monomer terminating with a hydrophobic chain represented by the general formula (I):

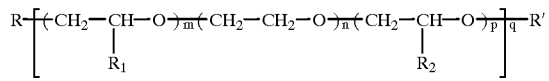

wherein m is at most 100, p is at most 100, n is at most 100, q is a number at least equal to 1 and such that $0 \leq q (n+m+p) \leq 100$, $R_1$ is hydrogen or a methyl or ethyl radical, $R_2$ is hydrogen or a methyl or ethyl radical, R is a polymerizable unsaturated radical derived from an acrylic, methacrylic, maleic, itaconic, crotonic, or vinylphthalic ester or an unsaturated urethane which is acrylurethane methacrylurethane α,α' dimethyl-m-isopropenyl-benzylurethane or allylurethane, R' is a tristyrylphenyl group or a linear or branched alkyl, alkylaryl, arylalkyl, aryl group having at least 8 carbon atoms, a dialkyl amine having at least 8 carbon atoms when R represents the unsaturated urethane, or R' is a tristyrylphenyl radical, a linear or branched alkyl, alkylaryl, arylalkyl, aryl group having more than 30 carbon atoms or a dialkylamine having more than 22 carbon atoms when R represents polymerizable unsaturated radical derived from an acrylic, methacrylic, maleic, itaconic, crotonic, or vinylphthalic ester, wherein the sum of the weight percent of (a), (b), (c) and (d) in the copolymer is 100%, and the copolymer has a specific viscosity of at most 50.

2. The method of claim 1, wherein (a) comprises at least one monomer selected from the group consisting of acrylic acid, methacrylic acid, crotonic acid, isocrotonic acid, cinnamic acid, itaconic acid, fumaric acid, maleic acid, citraconic acid, maleic anhydride, the $C_1$ to $C_4$ monoesters of maleic acid, and the $C_1$ to $C_4$ monoesters of itaconic acid, (b) comprises at least one monomer selected from the group consisting of acrylamido-methyl propane-sulphonic acid, sodium methallylsulphonate, vinyl sulphonic acids, the styrene sulphonic acids, ethylene glycol methacrylate phosphate, propylene glycol methacrylate phosphate, ethylene glycol acrylate phosphate, propylene glycol acrylate phosphate and their ethoxylates, (c) comprises at least one monomer selected from the group consisting of the esters of acrylic or methacrylic acids, acrylonitrile, methacrylonitrile, vinyl acetate, styrene, methylstyrene, diisobutylene, vinylpyrrolidone, vinylcaprolactam, unsaturated amides, the acrylic or methacrylic esters of glycol, methacrylamido-propyl-trimethyl-ammonium chloride or sulphate, the methacrylate of trimethyl-ammonium-ethyl chloride or sulphate and their acrylate and quaternized acrylamide counterparts, and dimethyldiallylammonium chloride, and the copolymer has a specific viscosity of at most 25.

3. The method of claim 2, wherein the copolymer contains:

from 99 to 10% by weight of (a),
from 0 to 50% by weight of (b),
from 0% to 50% by weight of (c), and
from 1% to 90% by weight of (d).

4. The method of claim 2, wherein the copolymer contains:

from 97 to 50% by weight of (a),
from 0 to 50% by weight of (b),
from 0% to 50% by weight of (c), and
from 3% to 50% by weight of (d).

5. The method of claim 2, wherein (c) comprises at least one monomer selected from the group consisting of methyl, ethyl, butyl, 2-ethyl-hexyl acrylates or methacrylates, acrylonitrile, methacrylonitrile, vinyl acetate, styrene, methylstyrene, diisobutylene, vinylpyrrolidone, vinylcaprolactam, acrylamide, methacrylamide, dimethylaminopropyl acrylamide or methacrylamide, the acrylic or methacrylic esters of glycol, methacrylamido-propyl-trimethyl-ammonium chloride or sulphate, the methacrylate of trimethyl-ammonium-ethyl chloride or sulphate and their acrylate and quaternized acrylamide counterparts, and dimethyldiallylammonium chloride.

6. The method of claim 1, wherein R' is a branched alkyl group having 32 carbon atoms when R is a methacrylic ester.

7. The method of claim 1, wherein R' is a tristyrylphenyl group when R represents a methacrylic ester or a methacrylurethane.

8. The method of claim 1, wherein the copolymer is in acid form, or is partially or totally neutralized by one or more neutralizing agents having a monovalent function selected from the group consisting of alkaline cations, primary, secondary or tertiary aliphatic and/or cyclic amines, and/or one or more neutralizing agents having a polyvalent function selected from the group consisting of alkaline earth divalent cations, zinc, trivalent cations, or cations with a valency higher than 3.

9. The method of claim 8, wherein the monovalent alkaline cation is sodium, potassium or ammonium; the primary, secondary or tertiary aliphatic and/or cyclic amines are monostearylamine, distearylamine, mono-ethanolamine, diethanolamine, triethanolamine, mono-ethylamine, diethylamine, cyclohexylamine or methylcyclohexylamine; the alkaline earth divalent cations are calcium or magnesium; and the cations with a valency higher than 3 are aluminum.

10. The method of claim 1, comprising 0.05% to 5% by weight of the copolymer relative to the dry weight of the mineral substance.

11. The method of claim 1, wherein the mineral substance comprises a mineral substance with a charged hydrophilic surface.

12. The method of claim 11, wherein the mineral substance comprises a least one member selected from the group consisting of natural or synthetic calcium carbonates, dolomite, a kaolin and mixtures thereof.

13. The method of claim 11, wherein the mineral substance comprises a least one member selected from the group consisting of chalk, calcite and marble 14. The method of claim 11, wherein the mineral substance comprises calcium carbonate.

15. The method of claim 1, wherein the mineral substance comprises a mineral substance with a hydrophobic surface.

16. The method of claim 15, wherein the mineral substance comprises at least one member selected from the group consisting of talc, mica and mixtures thereof.

17. The method of claim 1, wherein the mineral substance comprises a mixture of mineral substances with a hydrophilic surface and/or a mixture of mineral substances with a hydrophobic surface.

18. The method of claim 17, wherein the mineral substance comprises a mixture of talc and calcium carbonate or a mixture of talc and kaolin.

19. The method of claim 1, wherein the mineral substance has a grain size such that 90% of the particles have a diameter of less than 2 micrometers.

20. The method of claim 1, wherein the dispersion contains at least 5% by weight of the mineral substance.

21. The method of claim 1, wherein the dispersion contains at least 60% by weight of the mineral substance.

22. A method of crushing mineral substances, comprising:

agitating an aqueous suspension comprising:

water, at least one mineral substance, a crushing agent, and a copolymer which comprises the following monomers in polymerized form:

(a) at least one ethylenically unsaturated monomer having at least one carboxyl function, (b) optionally, at least one ethylenically unsaturated monomer having at least one sulphonic function and/or phosphoric function, (c) optionally, at least one ethylenically unsaturated monomer having no carboxyl function, and (d) at least one ethylenically unsaturated oxyalkylated monomer terminating with a hydrophobic chain represented by the general formula (I):

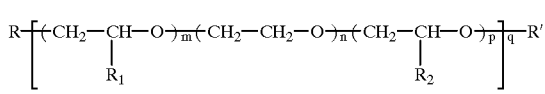

wherein m is at most 100, p is at most 100, n is at most 100, q is a number at least equal to 1 and such that 0≦q (n+m+p)≦100, $R_1$ is hydrogen or a methyl or ethyl radical, $R_2$ is hydrogen or a methyl or ethyl radical, R is a polymerizable unsaturated radical derived from an acrylic, methacrylic, maleic, itaconic, crotonic, or vinylphthalic ester or an unsaturated urethane, R' is a hydrophobic radical, wherein the sum of the weight percent of (a), (b), (c) and (d) in the copolymer is 100%, and the copolymer has a specific viscosity of at most 50, to crush the mineral substance.

23. The method of claim 22, wherein the crushing agent comprises silicon oxide, aluminum oxide, zirconium oxide, synthetic resins or a steel.

24. The method of claim 22, wherein the ratio of the crushing agent to the mineral substance is at least 2:1.

* * * * *

UNITED STATES PATENT AND TRADEMARK OFFICE
CERTIFICATE OF CORRECTION

PATENT NO. : 6,093,764
DATED : July 25, 2000
INVENTOR(S) : Jean-Bernard Egraz, et al.

It is certified that error appears in the above-identified patent and that said Letters Patent is hereby corrected as shown below:

Title page,
Item [75], "Christian Jacquemet, Lyons;" should read -- Christian Jacquemet, Lyon; --

Column 1,
Line 29, "theological behavior" should read -- rheological behavior --.

Column 4,
Line 47, "methacrylamido-propyltrimethyl-amrnmonium" should read -- methacrylamido-propyltrimethyl-ammonium --.

Column 6,
Line 31, "the f low time" should read -- the flow time --;
Line 47, "practical one way" should read -- practical way --.

Column 14,
Line 41, "radical RI is" should read -- radical R' is --.

Column 15,
Lines 27-29, "moles of ethylene oxide. Test N° 47:
        This test, illustrating the invention, uses a polyer which,"
should read -- moles of ethylene oxide.
        Test N° 47:
        This test, illustrating the invention, uses a polyer which, --.
Line 43, "10% of –tristyryl phenol" should read -- 10% of tristyryl phenol --.

Column 16,
Line 40, "the invent on, uses" should read -- the invention, uses --.

Column 27,
Line 8, "is 2380 mpa.s." should read -- is 2380 mPa.s. --;
Line 51, "is 1860 mpa.s." should read -- is 1860 mPa.s. --.

Column 28,
Line 29, "is 150 mpa.s." should read -- is 150 mPa.s. --.

UNITED STATES PATENT AND TRADEMARK OFFICE
CERTIFICATE OF CORRECTION

PATENT NO. : 6,093,764
DATED : July 25, 2000
INVENTOR(S) : Jean-Bernard Egraz, et al.

It is certified that error appears in the above-identified patent and that said Letters Patent is hereby corrected as shown below:

<u>Column 30,</u>
Line 16, "is 350 mpa.s. 68" should read -- is 350 mPa.s. --;
Lines 38-40, "25. Test N° 104:
      This test, illustrating the invention, uses a polymer neu-"
should read -- 25.
      Test N° 104:
          This test, illustrating the invention, uses a polymer neu- --.

Signed and Sealed this

Thirteenth Day of November, 2001

Attest:

*Nicholas P. Godici*

*Attesting Officer*

NICHOLAS P. GODICI
*Acting Director of the United States Patent and Trademark Office*